May 28, 1940.	H. DE KOEVEND	2,202,517
LIQUID LEVEL REPORTING APPARATUS
Original Filed Sept. 7, 1935    3 Sheets-Sheet 1

Inventor
HERMAN DE KOEVEND

By
Attorney

May 28, 1940. H. DE KOEVEND 2,202,517
LIQUID LEVEL REPORTING APPARATUS
Original Filed Sept. 7, 1935  3 Sheets-Sheet 3

Inventor
HERMAN DE KOEVEND
By
Attorney

Patented May 28, 1940

2,202,517

UNITED STATES PATENT OFFICE 2,202,517

LIQUID LEVEL REPORTING APPARATUS

Herman De Koevend, Lake Cheeseman, Colo.

Application September 7, 1935, Serial No. 39,592
Renewed September 29, 1939

4 Claims. (Cl. 177—351)

This invention relates to apparatus arranged to audibly report, automatically, the then existing level of a body of liquid upon demand from a remote station, and has as an object to provide an improved assembly and combination of elements operable to the end set forth.

A further object of the invention is to provide an improved operative assembly of substantially conventional elements suitably associated to audibly report the then existing level of a body of liquid upon demand from a remote calling station.

A further object of the invention is to provide an improved combination of liquid-level actuated means with a permanent reproducible record of liquid level, whereby reproducing means associated with said record may be constantly positioned to report the true liquid level as determined by the liquid-level actuated means.

A further object of the invention is to provide improved liquid-level reporting means arranged for automatic, cooperative association with a telephone circuit.

A further object of the invention is to provide improved automatic means for advancing and retracting the tracing element of a reproducer into and out of operative association with a permanent sound record.

A further object of the invention is to provide an improved arrangement and combination of telephone and ringing circuits operable automatically to energize a reporting station upon demand from a remote calling station.

A further object of the invention is to provide an improved liquid-level reporting apparatus which is readily adapted to a wide variety of specific installations, which can be readily assembled from largely conventional equipment, which is fully and completely automatic in operation at the reporting station, which is positive, efficient and accurate in operation, and which normally requires no maintenance or supervision whatsoever.

My invention consists in the construction, arrangement and combination of elements hereinafter set forth, pointed out in my claims and illustrated by the accompanying drawings in which—

Figure 1:
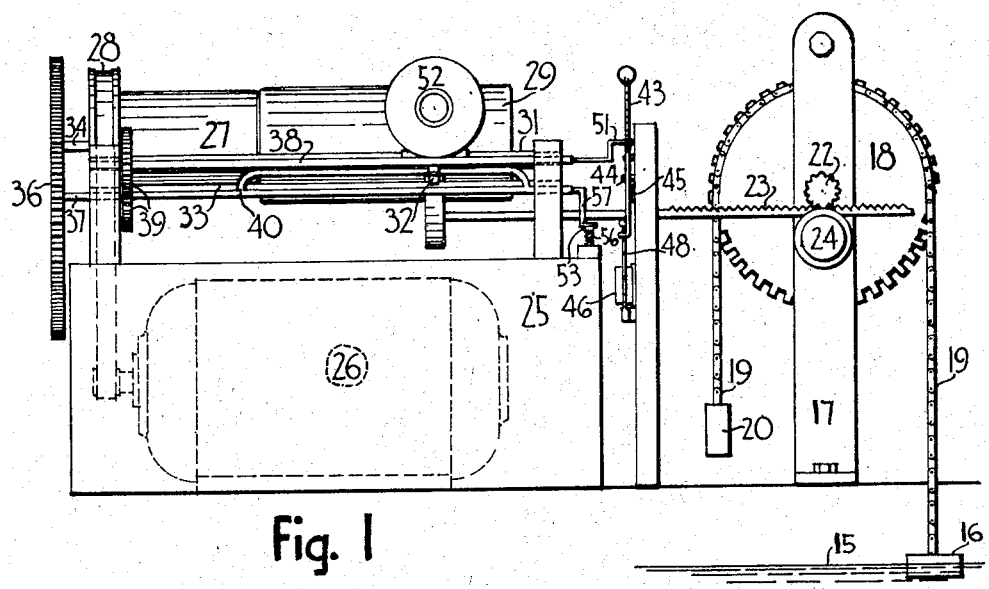
Figures 2, 3, 4:
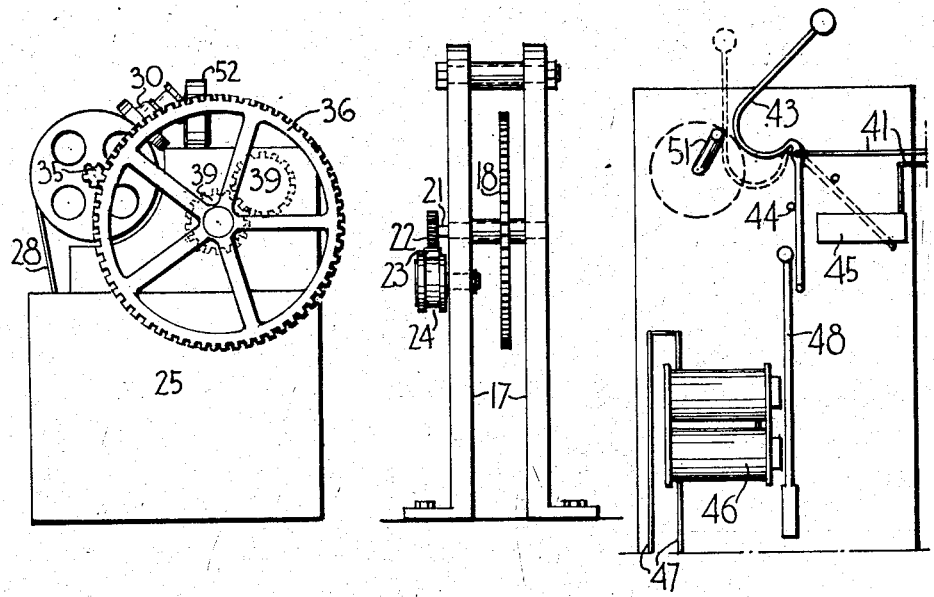
Figure 6:
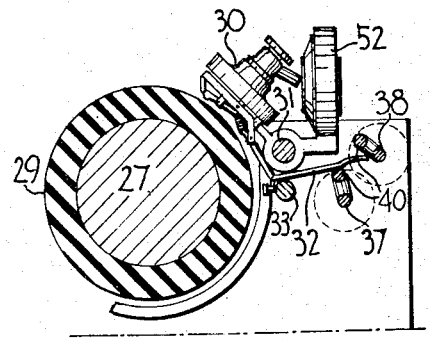
Figure 5:
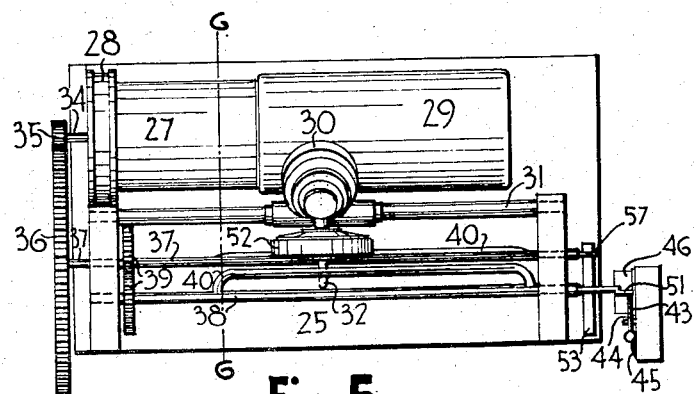
Figure 7:
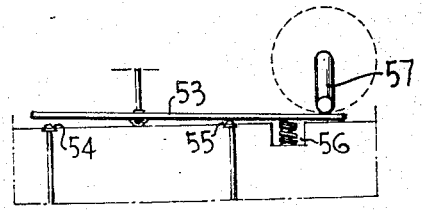
Figure 10:
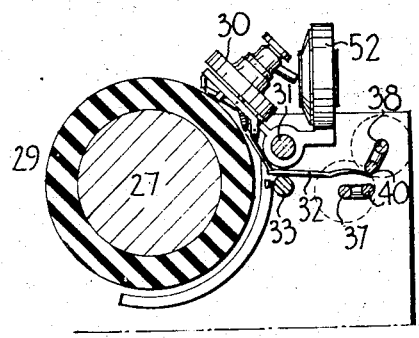
Figure 9:
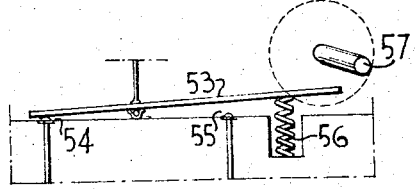
Figure 8:
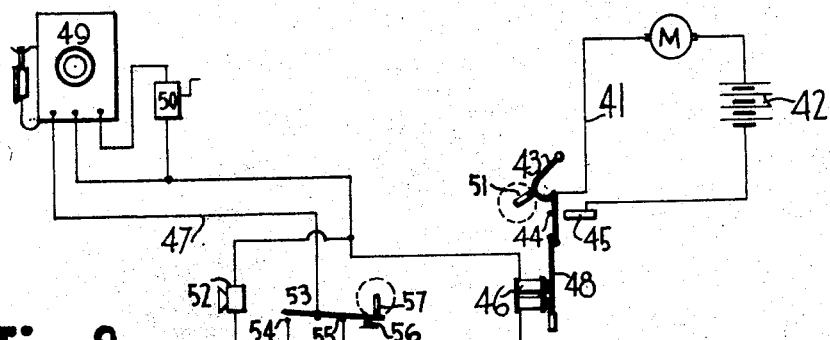
Figure 11:
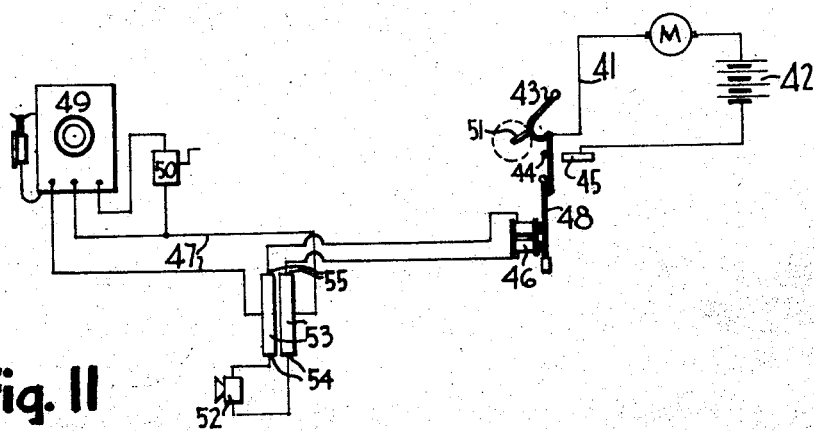
Figure 12:
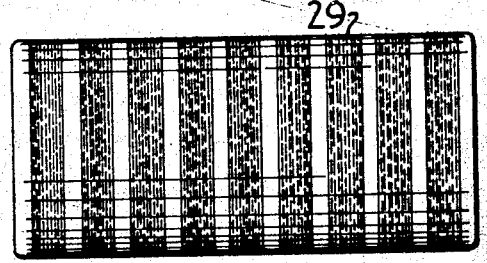

Figure 1 is a diagrammatic elevation of the apparatus employed with the liquid-level reporting station. Figure 2 is an end elevation of the reporting apparatus shown in Figure 1. Figure 3 is an end elevation of float-controlled positioning means employed in the improved apparatus. Figure 4 is a fragmentary, detail elevation of switch means employed with the improvement. Figure 5 is a top plan view of the reporting apparatus shown in Figures 1 and 2. Figure 6 is a cross section taken on the indicated line 6—6 of Figure 5. Figure 7 is a fragmentary, detail view of automatic switch means employed in the improved assembly. Figure 8 is a conventionalized diagram of the wiring and connections employed in the operation of the improvement. Figure 9 is a view similar to Figure 7 illustrating an alternative position of the switch means of the latter figure. Figure 10 is a cross section similar to Figure 6 illustrating alternative positions of some of the elements shown in the latter figure. Figure 11 is a wiring diagram similar to Figure 8 showing a method of wiring the elements of the improvement modified somewhat in respect to the showing of the latter figure. Figure 12 is an elevation of a record cylinder adapted for use in the improved apparatus.

In the construction of the improvement as shown, the surface of a body of liquid whereof the level is required to be frequently ascertained is designated by the numeral 15, and a float member 16, of any suitable form, size and construction is arranged to be supported by and ride in uniform relation with the liquid surface 15, it being apparent that the float member 16 might be disposed in a well or other compartment separate from and in communication with the main body of liquid. A suitable frame 17 is disposed in convenient relation with the body of liquid or float compartment and is arranged to rotatably support a vertically-positioned wheel 18 of sprocket or equivalent type. A chain 19 or similar flexible connecter is secured at one end to the float 16 and is passed over and in suitable engaging relation with the wheel 18 to engagement of its other end with a counterbalancing weight 20, so that, as the float 16 varies in altitudinal position with variations in the liquid level such altitudinal variation acts through the connecter 19 to effect proportional rotation of the wheel 18. The wheel 18 is fixed to its spindle 21, which latter is extended at one end through the frame 17 and supports a pinion 22 in fixed relation thereon, said pinion in turn meshing with a horizontally-disposed rack bar 23 arranged for longitudinal reciprocation and held in meshing relation with said pinion by means of a suitable rotatable guide 24 carried by the frame 17. With the above described or an equivalent arrangement of elements, it is obvious that variations in the altitudinal position of the float 16 act to produce proportional longitudinal displacement of the rack bar 23.

The mechanical reporting apparatus employed with the improvement may take any one of various specific forms of suitably modified conventional devices, and is indicated as comprising a suitable base housing 25 enclosing an electric motor indicated by dotted lines at 26 and a horizontally-disposed cylinder 27 suitably supported for rotation on and above the base 25 and connected in driven relation with the motor 26 by means of a belt 28. The cylinder 27 is adapted to slidingly receive and rotate a hollow record cylinder 29 whereon have been suitably impressed a plurality of records in uniformly spaced discontinuous relation. Each of the records carried by the cylinder 29 comprises, when suitably reproduced, a single message repetitiously reciting a given guage or measure employed in the determination of the liquid level. For example, one of the record bands on the cylinder 29 might, when reproduced, repeatedly recite a certain number of inches, the adjacent record band on one side being arranged to repeatedly recite a lesser number of inches, and the adjacent record band on the other side being arranged to repeatedly recite a greater number of inches, or, in like manner, the record bands could well be arranged to refer to liquid levels measured in feet, fractions of feet, yards, meters, or by arbitrarily selected symbols, numerals or letters. A reproducer assembly 30, of conventional type, is slidably mounted on a suitable frame bar 31 disposed in axially parallel relation with the cylinder 27 for operative association with the record bands of the cylinder 29, and one end of the rack bar 23 is suitably secured to the reproducer assembly in such manner as to position said reproducer longitudinally of the record cylinder 29 in proportional relation with the altitudinal position of the float 16, it being understood that the gear ratios employed and the arrangement of record bands on the cylinder 29 being such as to position the reproducer opposite that record band corresponding with the true level of the body of liquid as determined by the float carried thereon. The reproducer 30 is normally held out of engagement with the cylinder 29 and is provided with a suitable conventional trip lever 32 operable through manipulation of its free end to move said reproducer into or out of engagement with the record cylinder, as is common practice in devices of similar type. A suitable feed screw 33 is disposed in axially parallel relation with the cylinder 27 and is arranged for simultaneous rotation proportioned to that of said cylinder, and the reproducer assembly 30 is arranged to engage said feed screw when in reproducing engagement with the cylinder 29 and be thereby moved longitudinally of the cylinder 29 at a speed suitable for proper reproduction of the record bands carried by said cylinder, said reproducer being arranged to disengage the feed screw 33 when not in reproducing relation with the record cylinder 29 and be then free for travel longitudinally of said cylinder as controlled by the rack bar 23. The trip lever 32 is so associated with the reproducer 30 as to move said reproducer into engagement of its tracing element with the record 29 and simultaneously engage said reproducer with the feed screw 33 when the free end of said lever is moved in one direction, travel of the free end of said lever in the opposite direction acting to disengage the reproducer from both the feed screw 33 and the record 29, such trip mechanism being commonly employed for like purposes in conventional phonographic and equivalent record reproducing devices. The instant invention provides means automatically operable to engage and disengage the reproducer 30 relative to the record 29 and feed screw 33, such means being arranged to engage and actuate the trip lever 32 at suitable time intervals. As shown in the drawings, an axial shaft 34 extends in fixed relation from and for rotation with the driven end of the cylinder 27, said shaft being provided with a pinion 35 on its outer end in meshing relation with a relatively large gear 36 fixed to one end of a shaft 37 journaled for rotation in suitable frame elements in spaced, parallel relation with the axis of the cylinder 27 and adjacent and below the free end of the tripping lever 32. Another shaft 38 is suitably journaled in spaced, parallel relation with the shaft 37 adjacent and above the free end of the trip lever 32, and gears 39, of equal size, are fixed in meshing relation to each of the shafts 37 and 38 so that rotation of the former is transmitted through the gears 39 to the latter to effect rotation thereof at the same speed as and in a direction opposite to that of the shaft 37. The spacing between the shafts 37 and 38 is somewhat in excess of the range of travel permitted to the free end of the trip lever 32, said lever consequently being free for the manipulation between said shafts, and each of said shafts 37 and 38 is provided with a relatively long radially offset element 40 longitudinally coextensive with the maximum travel of the reproducer 30 longitudinally of the record cylinder 29 and projecting radially from its shaft a distance sufficient for engagement with and actuation of the trip lever 32 during rotation of its shaft. The radial offsets 40 rotate with their respective shafts at uniform speeds and in opposite directions when the cylinder 27 is rotatively driven by the motor 26, and said offsets 40 are so angularly related with each other and so positioned relative to the trip lever 32 as to permit one of said elements 40 to immediately engage and actuate the trip lever to move the reproducer into cooperating relation with its record cylinder when the cylinder 27 first begins to rotate, whereafter said element 40 clears the trip lever during the remainder of its cycle and returns to its original potential actuating position as the other element 40 contacts the trip lever 32 and actuates the latter to effect disengagement of the reproducer from its record cylinder, the shafts 37 and 38, and consequently have radial offset elements 40, being driven with a speed which will permit reproduction of an entire record band on the cylinders 29 during the time interval between engagement and disengagement of the reproducer relative to the record as controlled by said offset elements 40.

It will be apparent that the apparatus thus far described is operable, through energization of the motor 26, to audibly report a liquid level determined by the altitudinal position of the float 16 which, through the means set forth, determines the position of the reproducer 30 relative to the record bands carried by the cylinder 29, initial motion of the motor 26 acting through the means described to position the reproducer 30 in cooperating relation with the cylinder 29 for reproduction of the message imposed on said cylinder in that record band engaged by the traversing element of said reproducer. Naturally, were the liquid level to be ascertained at the reporting station no such reporting apparatus as has been described would be required, since the liquid level could then be read directly from any one of a number of suitable devices, and the advantage of the instant invention is found primarily in its adaptability to the requirement of reports to remote calling stations. To render the hereabove described apparatus available for reports to remote stations it is necessary that means be provided whereby the motor 26 may be energized from the calling station and wherethrough the message delivered by the reproducer 30 may be transmitted to the calling station. Such energizing and transmitting means as are necessary are readily available in a single electric telephone circuit which may be readily adapted to the requirements set forth as is illustrated in the drawings and hereinafter described. The motor 26 is suitably wired in an independent electrical circuit 41 wherein is included a source of electrical energy 42. The motor circuit 41 includes a suitable trip-switch element conveniently operable to maintain said circuit in either open or closed circuit relation, such a trip-switch being illustrated as comprising a balanced trip finger 43 suitably pivoted for oscillation in a vertical plane and connected with one side of the circuit 41. The trip finger 43 is so positioned and balanced as to normally rest in a substantially vertical position against a stop 44, from which position it may be readily dislodged by slight impact against its lower end to then travel by virtue of its unbalanced weight through an arc to the position shown by dotted lines in Figure 4, in which position it slidingly engages against a suitable spring contact 45 operatively connected with the other branch of the circuit 41 to complete said circuit. The trip finger 43 is arranged to be tripped into closing relation of the circuit 41 by means of any suitable agency operable from the remote calling station, one such agency being conventionally illustrated in the form of an electric bell or buzzer assembly 46 included in the telephone circuit 47 connecting the remote calling station with the reporting apparatus, the vibrator element 48 of the assembly 46 being positioned with its free end closely adjacent the depending end of the trip finger 43 so that closing of the circuit 47 at the calling station, indicated by the numeral 49, acts to energize the assembly 46 to effect vibration of the element 48, the free end of the latter striking the depending end of the trip finger 43, unbalancing the latter which then swings into circuit closing relation with the contact 45. The telephone circuit 47 may of course be arranged for closing in any suitable manner and may, as is common practice, include a ringing element 50 arranged for manual actuation to provide the current necessary for energization of the assembly 46. When the circuit 41 has been closed by means of the trip finger 43 as above set forth, the motor 26 will continue to function until its source of energy is exhausted or until the circuit 41 is broken, it being desirable that operation of the motor be arrested upon completion of the message included in a given record band of the cylinder 29. To open the circuit 41 the trip finger 43 need only be returned to its original balanced position, to which end an extension of the shaft 38 of the reporting apparatus is provided with a radially offset arm or crank 51 disposed for travel in an orbit adjacent and coplanar with the plane of oscillation of the trip finger 43, said arm 51 being so related with the offset 40 carried by the shaft 38 as to bring the offset end of said arm 51 into contacting relation with the trip finger 43 and return of the latter to its original position simultaneously with disengagement of the reproducer 30 from the cylinder 29 effected through the agency of the shaft 38 and its radial offset 40. Thus, when the motor 26 has operated through a time interval sufficient for reproduction of a given record band from the cylinder 29 as determined by engagement and disengagement of the reproducer 30 relative to said cylinder 29 effected through the offsets 40 carried by the shafts 37 and 38, the arm 51 is brought into engagement with the trip finger 43 in such manner as to move said trip finger to its original open circuit relation with the contact 45, automatically repositioning said trip finger relative to the vibrator 48 and arresting the motor 26. To deliver the message from the record cylinder 29 through the reproducer 30 to the remote calling station 49, a suitable telephone transmitter or microphone 52 is operatively associated with the reproducer 30 and is carried thereby, said transmitter 52 being operatively included in a branch of the telephone circuit 47. Since there is no occasion for simultaneous operation of the assembly 46 and transmitter 52, automatic means operable to include but one of said elements in the circuit 47 is provided, said means taking the form of a switch bar 53 mounted for oscillation adjacent the reporting apparatus and operatively connected with one side of the circuit 41. The opposite ends of the switch bar 53 are arranged to selectively engage contacts 54 and 55 connected respectively with the circuits of the transmitter 52 and vibrator assembly 46, and a suitable spring 56 is positioned to normally urge the switch bar 53 into circuit closing engagement with the contact 54. Since the circuit to the vibrator assembly 46 should be closed when the reporting apparatus is at rest, a radially offset arm or crank 57 is carried on an axial extension of the shaft 37 and is so positioned as to engage an extended end of the switch bar 53 and oscillate the latter against the pressure of the spring 56 into engagement with the contact 52 and consequent closing relation with the circuit through the vibrator assembly at the same time as the arm 51 acts on the trip finger 43 to arrest the motor 26. Thus when the reporting apparatus is at rest the circuit through the transmitter 52 is open and that circuit through the vibrator assembly is closed and in operative relation with the remote calling station 49, actuation of the motor 26 resulting from a call from the station 49 immediately operating through the gears and connections provided to rotate the arm 57 out of engagement with the switch bar 53 to permit circuit closing engagement of said bar with the contact 54 under the influence of the spring 56 and consequent inclusion of the transmitter 52 in the telephone circuit 47 as the circuit to the vibrator assembly is opened. With the circuit 47 arranged to include the calling station 49 and transmitter 52, the message from the record cylinder 29 through the reproducer 30 is picked up by said transmitter and carried over the telephone circuit 47 to the receiver at the calling station, where such message may be heard and recorded to give the exact level of the body of liquid wherewith the apparatus is operatively associated.

The practical operation of the improved assembly as hereabove described should be immediately apparent from the detailed description heretofore given, it being obvious that with the elements positioned and arranged as above set forth energization of the circuit 41 either through lifting of the telephone receiver at the calling station 49 or through actuation of the ringer unit 50 serves to activate the vibrator 48 to move the trip finger 43 into closing relation with the circuit 41 for a consequent activation of the motor 26. When the motor 26 is operated, the switch bar 52 and calling station 49 and the circuit through the vibrator assembly is simultaneously interrupted, the shaft 37 is caused to rotate and acts through its radial offset 40 into cooperating relation with the rotating record cylinder 29 for reproduction of that message on said record cylinder corresponding with the liquid level 15 as determined by the float 16 and connected elements. Once the reporting apparatus has been set in motion, it is immaterial whether or not the circuit 47 remains open or closed at the calling station 49, since the apparatus will continue to operate and the transmitter 52 continue to function until the arm 51 contacts the trip finger 43 and open the circuit to the motor 26, disengagement of the reproducer from its record cylinder and return of the switch bar 53 to closed circuit relation with the vibrator assembly occurring simultaneously with or just prior to the interruption of the motor circuit 41.

Since it will be obvious that the specific instrumentalities shown and described are but typical of functionally equivalent devices, and since it is apparent that the various elements and devices illustrated and described could be and in specific instances should be combined and arranged in various specifically distinct but functionally equivalent systems, it is to be understood that the drawings and description are but typical of an operative relation of essential elements and in no sense limitative, the invention contemplating and properly including all variations and modifications of form, construction and arrangement embraced within the spirit thereof as defined by and falling within the scope of the appended claims.

I claim as my invention—

1. In telemetric signaling apparatus, a rotatably-mounted, cylindrical phonograph record provided with a plurality of progressively arranged designating record bands, an electric motor in driving relation with said record, a normally open power circuit serving said motor, a reproducer adjacent and freely slidable longitudinally of said record, means directly connected with said reproducer and operable through the characteristic to be determined to automatically position the latter opposite that record band corresponding with the actual characteristic condition, a feed screw in synchronous driven relation with said record and engageable at times by said reproducer to feed the latter longitudinally of said record when in reproducing relation therewith, means automatically operable from a remote telephone station to close the circuit to said motor and and energize the latter, means in driven relation with said motor operable upon actuation of the latter to engage the reproducer with the feed screw and record and simultaneously include said reproducer in the telephone circuit of the calling station, and further means in driven relation with said motor automatically operable after a definite time interval to disengage said reproducer from its feed screw and record and simultaneously open the circuit to said motor.

2. In telemetric signaling apparatus having a rotatably-mounted, cylindrical phonograph record provided with progressively arranged, indicating record bands, an electric motor in driving relation with said record, and a normally open power circuit serving said motor, a reproducer adjacent and freely slidable longitudinally of said record, means directly connected with said reproducer and movable to constantly position the latter opposite the record band corresponding with a characteristic to be determined, a feed screw in synchronous driven relation with said record and engageable at times by said reproducer to feed the latter longitudinally of the record, means operable from a remote telephone station to close the circuit serving said motor and energize the latter, means in driven relation with said motor operable upon actuation of the latter to engage the reproducer with its feed screw and in reproducing relation with the record and simultaneously connect said reproducer in the telephone circuit of the calling station, and means in synchronized relation with said latter means automatically operable after a definite time interval to disengage said reproducer from its feed screw and record and simultaneously open the circuit serving said motor.

3. In telemetric signaling apparatus having a rotatably-mounted, cylindrical phonograph record provided with progressively arranged, indicating record bands, an electric motor in driving relation with said record, and a normally open power circuit serving said motor, a reproducer adjacent and freely slidable longitudinally of said record, means directly connected with said reproducer and movable to constantly position the latter opposite the record band corresponding with a characteristic to be determined, a feed screw in synchronous driven relation with said record and engageable at times by said reproducer to feed the latter longitudinally of the record, means operable from a remote telephone station to close the circuit serving said motor and energize the latter, means in driven relation with said motor operable upon actuation of the latter to engage the reproducer with its feed screw and in reproducing relation with the record and simultaneously connect said reproducer in the telephone circuit of the calling station, and means in synchronized relation with said latter means automatically operable after a definite time interval to disengage said reproducer from its feed screw and record and simultaneously open the circuit serving said motor, said last named means being synchronized and timed to automatically reposition the elements of the assembly for repetition of their operative cycle initiated through a subsequent call from a telephone station associated with the apparatus.

4. In telemetric signaling apparatus having a rotatably-mounted, cylindrical phonograph record provided with progressively arranged, indicating bands, an electric motor in driving relation with said record, and a normally open power circuit serving said motor, a reproducer freely slidable longitudinally of and adjacent said record, means operatively connected with said reproducer and movable to continuously position the latter opposite that record band corresponding with a characteristic to be determined, a feed screw in synchronous driven relation with said record and engageable at times by said reproducer to feed the latter longitudinally of the record, trip means associated with said reproducer and operable in one direction to operatively engage said reproducer with said record and feed screw and operable in the other direction to disengage said reproducer from said record and said screw, means operable from a remote telephone station to close the circuit serving said motor and energize the latter, means in driven relation with said motor operable upon actuation of the latter to actuate said trip means and engage said reproducer with the record and feed screw and simultaneously connect said reproducer in the telephone circuit of the calling station, and means in synchronized driven relation with said last named means automatically operable after a definite time interval to actuate said trip means for disengagement of the reproducer from the record and feed screw and to simultaneously open the circut serving said motor.

HERMAN DE KOEVEND.